(12) United States Patent
Gallucci et al.

(10) Patent No.: US 9,074,093 B2
(45) Date of Patent: Jul. 7, 2015

(54) BLENDS OF POLYPHENYLENE ETHER SULFONE AND POLYESTER CARBONATE

(75) Inventors: Robert Russell Gallucci, Mount Vernon, IN (US); Paul Dean Sybert, Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 204 days.

(21) Appl. No.: 13/315,515

(22) Filed: Dec. 9, 2011

(65) Prior Publication Data

US 2013/0150507 A1   Jun. 13, 2013

(51) Int. Cl.
*C07D 209/48* (2006.01)
*C08K 5/49* (2006.01)
*C08K 5/53* (2006.01)
*C08L 71/00* (2006.01)
*C08L 69/00* (2006.01)

(52) U.S. Cl.
CPC *C08L 71/00* (2013.01); *C08L 69/00* (2013.01)

(58) Field of Classification Search
CPC ........ C08L 69/00; C08L 69/005; C08L 71/00
USPC ..................................... 524/50, 94, 121, 132
See application file for complete search history.

(56) References Cited

U.S. PATENT DOCUMENTS

| | | |
|---|---|---|
| 4,176,222 A | 11/1979 | Cinderey et al. |
| 4,293,670 A | 10/1981 | Robeson et al. |
| 4,473,684 A | 9/1984 | Maresca et al. |
| 4,503,168 A | 3/1985 | Hartsing, Jr. |
| 5,037,902 A | 8/1991 | Harris et al. |
| 5,134,202 A | 7/1992 | Harris et al. |
| 5,191,305 A | 3/1993 | Frost et al. |
| 5,212,259 A | 5/1993 | Harris et al. |
| 5,521,230 A | 5/1996 | Bhatia et al. |
| 6,482,880 B1 | 11/2002 | Rock |
| 7,452,944 B2 | 11/2008 | Gallucci et al. |
| 7,649,040 B2 | 1/2010 | Choate, Jr. et al. |
| 7,790,292 B2 | 9/2010 | Colborn et al. |
| 7,932,310 B2 | 4/2011 | Gallucci et al. |
| 2005/0038145 A1* | 2/2005 | Gallucci et al. ............... 524/157 |
| 2005/0113558 A1 | 5/2005 | Johnson et al. |
| 2006/0069236 A1 | 3/2006 | Brunelle et al. |
| 2006/0167216 A1 | 7/2006 | Johnson et al. |
| 2007/0018265 A1 | 1/2007 | Koeda et al. |
| 2007/0149629 A1* | 6/2007 | Donovan et al. ............... 521/134 |
| 2009/0258991 A1 | 10/2009 | Yamaguchi et al. |

FOREIGN PATENT DOCUMENTS

| | | |
|---|---|---|
| EP | 2366740 A2 | 9/2011 |
| WO | 2009105377 A2 | 8/2009 |

OTHER PUBLICATIONS

International Search Report for International Applicaiton No. PCT/US2012/068483, International Application Filing Date: Dec. 7, 2012; Date of Mailing: Jun. 4, 2013; 4 pages.
Written Opinion for International Application No. PCT/US20121068483, International Application Filing Date: Dec. 7, 2012; Date of Mailing Jun. 4, 2013; 5 pages.

* cited by examiner

*Primary Examiner* — Jane L Stanley
(74) *Attorney, Agent, or Firm* — Cantor Colburn LLP

(57) ABSTRACT

Disclosed herein is a miscible, high flow composition comprising 80 to 99 wt % of a polyphenylene ether sulfone and 1 to 20 wt % of an aryl polyester carbonate copolymer, based on the combined weight of the polyphenylene ether sulfone and the aryl polyester carbonate copolymer.

13 Claims, No Drawings

BLENDS OF POLYPHENYLENE ETHER SULFONE AND POLYESTER CARBONATE

BACKGROUND

Disclosed herein are blends of polyphenylene ether sulfone and polyester carbonate, methods for making the blends, and articles derived from such blends. The blends have a particularly advantageous combination of properties.

Polyphenylene ether sulfones (PPSU) are well known engineering thermoplastics made by condensation polymerization. The PPSU polymers have an exceptionally high impact strength without rubber modification, however in many applications such as transportation and electronic applications, their high melt viscosity makes them difficult to mold into large thin walled parts. Additionally, blends of PPSU with other polymers frequently are hazy and opaque, typically due to miscibility issues. In many applications, particularly thin walled applications, transparency is highly desirable.

For the foregoing reasons, there exists an unmet need for compositions comprising PPSU that have sufficiently high melt flow to be molded into thin walled parts yet retain the desirable properties of PPSU such as high impact strength. Additionally it would be highly useful if such compositions were transparent.

BRIEF DESCRIPTION

Disclosed herein is a composition comprising 80 to 99 weight percent of a polyphenylene ether sulfone and 1 to 20 weight percent of an aryl polyester carbonate copolymer, based on the combined weight of the polyphenylene ether sulfone and the aryl polyester carbonate copolymer. The composition comprises less than 0.1 weight percent polycarbonate, based on the total weight of the composition. In some embodiments the composition may be free of polycarbonate. The composition has a melt volume rate (MVR) at 337° C. of greater than or equal to 8.5 cubic centimeters per 10 minutes (cc/10 min). MVR is determined according to ASTM D1238 at 337° C. after six minutes of equilibration time using 6.7 kilograms (kg). The composition has a single glass transition temperature, which is greater than or equal to 200° C., as measured by differential scanning calorimetry as per ASTM D3418.

The above described and other features are exemplified by the following figures and detailed description.

DETAILED DESCRIPTION

As mentioned above, polyphenylene ether sulfones have excellent impact resistance without rubber modification, but also have high viscosity making them difficult to mold into thin walled parts, particularly large thin walled parts. Surprisingly, the addition of a polyester carbonate increases the melt flow compared to polyphenylene sulfone alone. The composition still has high impact strength. Furthermore, the blend of polyphenylene ether sulfone and polyester carbonate are miscible, as evidenced by the presence of a single glass transition temperature. Finally, the composition is transparent.

The composition can have a melt volume viscosity rate (MVR) at 337° C. of greater than or equal to 8.5 cubic centimeters per 10 minutes (cc/10 min), or, greater than or equal to 10.0 cc/10 min, or, greater than or equal to 15.0 cc/10 min MVR is determined according to ASTM D1238 at 337° C. after six minutes of equilibration time using 6.7 kilograms (kg). Additionally the composition can have a melt volume viscosity rate (MVR) at 337° C., after 18 minutes of equilibration time, that is less than 1.3 times the MVR at 337° C. after 6 minutes of equilibration time. Stated another way, the composition can have a melt volume viscosity rate (MVR) at 337° C., after 18 minutes of equilibration time, that is less than 30% greater than the MVR at 337° C. after 6 minutes of equilibration time. This small change in MVR on exposure to 337° C. shows good melt stability of the blend and will aid processing into large parts requiring long molding cycles.

The composition can have a multiaxial impact strength greater than or equal to 70 Joules (J), or, greater than or equal to 75 J. Multiaxial impact strength is determined at room temperature (23° C.) according to ASTM D3763.

The composition has a single glass transition temperature than is greater than or equal to 200° C., as determined by differential scanning calorimetry (DSC) as per ASTM D3418 with a 20° C./min heating rate. The glass transition temperature can be greater than or equal to 205° C., or, greater than or equal to 210° C.

In the absence of pigments or other visual effect additives the composition is transparent. Transparent is defined herein as having a percent transmittance (% T) of greater than or equal to 50% and a percent haze of less than or equal to 10% at 3.2 millimeters. Percent transmittance and percent haze are determined according to ASTM D1003.

The composition can have a heat distortion temperature greater than or equal to 175° C. when determined according to ASTM D648 at 264 pounds per square inch (psi) 1.82 megaPascals (MPa).

Polyphenylene ether sulfones comprise repeating units having both an ether linkage and an aryl sulfone linkage in the backbone of the polymer as shown in formula (1)

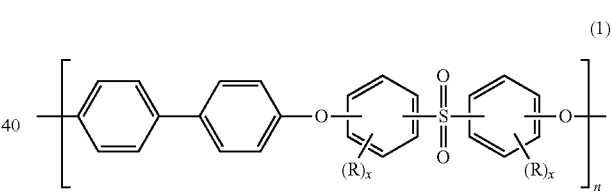

wherein R is hydrogen, alkyl, aryl, alkyl aryl, alkoxy, halogen or combination thereof, x equals 0 to 4, and n equals 25 to 1000, or, more specifically, n equals 25 to 500, or, more specifically, n equals 25 to 100. The aryl sulfone linkages may be 4,4', 3,3', 3,4' or mixtures thereof. In some embodiments the aryl sulfone linkages are 4,4' diaryl sulfone. In some embodiments greater than or equal to 50 mole percent of the main chain sulfone linkages are derived from biphenol.

An exemplary biphenol polyphenylene ether sulfone is shown in formula (2)

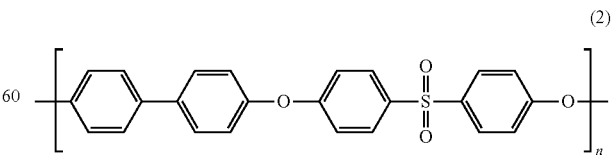

wherein n is as defined above.

In some embodiments, the polyphenylene ether sulfone is a polyphenylene ether sulfone copolymer of formula (3)

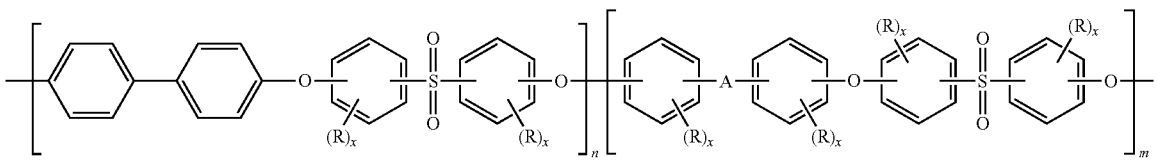

(3)

wherein A is a linking group selected from, —O—, —S—, —SO$_2$—, C$_6$-C$_{18}$ aryl, and C$_3$-C$_{12}$ alkyl. In some embodiments A is isopropylidene. Linkages of A to the aryl groups may be at the 4,4', 3,3', 3,4' positions or mixtures thereof. In many embodiments the linkages are at the 4,4' positions. R and x are defined as above; n>2m, and n+m equals 20 to 1000, or, more specifically n+m equals 25 to 500, or, even more specifically, n+m equals 25 to 100. Aryl sulfone linkages may be at the 4,4', 3,3', 3,4' positions or mixtures thereof. In many embodiments the linkages are at the 4,4' positions. In some embodiments the polyphenylene ether sulfones have n equal to 100% and m equal to 0%. Exemplary aromatic dihydroxy compounds that can be used to make the polyphenylene ether sulfone copolymers include biphenols, such as 4,4'-biphenol. Other exemplary aromatic dihydroxy compounds are disclosed in U.S. Patent Publication Nos. 2006/0167216, 2005/0113558, and 2006/0069236.

The polyphenylene ether sulfone can comprise a homopolymer, copolymer, or combination thereof. Copolymers include random copolymers, non-random copolymers, and block copolymers.

An example of a polyphenylene ether sulfone copolymer is shown below in formula (4)

The molecular weight of the polyphenylene ether sulfone, as indicated by reduced viscosity data in an appropriate solvent such as methylene chloride, chloroform, N-methylpyrrolidone, or the like, can be greater than or equal to 0.3 dl/g, or, more specifically, greater than or equal to 0.4 dl/g and, typically, will not exceed 1.5 dl/g.

The polyphenylene ether sulfone weight average molecular weight can be 10,000 to 100,000 grams per mole (g/mol) as determined by gel permeation chromatography using ASTM D5296 with polystyrene standards. In some embodiments the polyphenylene ether sulfone weight average molecular weight can be 20,000 to 70,000 grams per mole (g/mol). Polyphenylene ether sulfones may have glass transition temperatures of 180 to 250° C.

The polyphenylene ether sulfone is present in an amount of 80 to 99 weight percent, based on the combined weight of the polyphenylene ether sulfone and the aryl polyester carbonate copolymer. Within this range the poly polyphenylene ether sulfone may be present in an amount of 85 to 95 weight percent.

The aryl polyester carbonate (sometimes referred to herein as the "copolymer") comprises a carbonate unit of formula

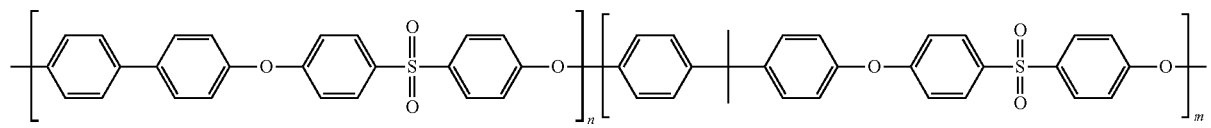

(4)

wherein n>2m, n+m=25 to 100, A (from formula (3)) is isopropyl, all aryl linkages are at the 4,4' positions and R (from formula (3)) is hydrogen. In other instances m is zero.

Polyphenylene ether sulfones are commercially available, including the polycondensation product of biphenol with dichloro diphenyl sulfone. An example is PPSU resin is RADEL™ R, available from Solvay, Inc.

Methods for the preparation of polyphenylene ether sulfones are widely known and several suitable processes have been well described in the art. Two methods, the carbonate method and the alkali metal hydroxide method, are known to the skilled artisan. In the alkali metal hydroxide method, a double alkali metal salt of a dihydric phenol is contacted with a dihalobenzenoid compound in the presence of a dipolar, aprotic solvent under substantially anhydrous conditions. The carbonate method, in which a dihydric phenol and a dihalobenzenoid compound are heated, for example, with sodium carbonate or bicarbonate and a second alkali metal carbonate or bicarbonate is also disclosed in the art, for example, in U.S. Pat. No. 4,176,222. Alternatively, the polyphenylene ether sulfone may be prepared by any of the variety of methods known in the art including those described in the U.S. Patent Publications referenced above.

(5) and an ester unit of formula (6). The aryl polyester carbonate can optionally comprise a siloxane unit of formula (7) or formula (8),

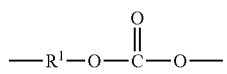

(5)

(6)

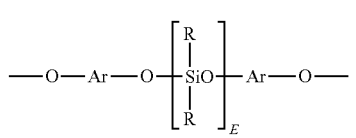

(7)

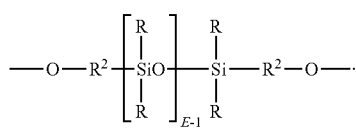
(8)

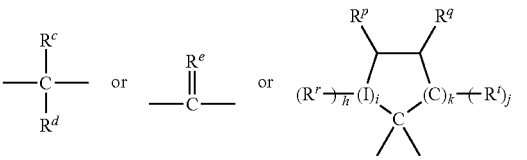
(12)

In the carbonate units of formula (5) greater than or equal to 90 percent of the total number of $R^1$ groups are aromatic organic groups and the balance thereof are aliphatic or alicyclic groups. The aromatic organic groups may be derived from dihydroxy aromatic compounds, including resorcinols or bisphenols. In an embodiment, each $R^1$ is a $C_{6-30}$ arylene group. $R^1$ can be a group of the formula (9):

$-A^1-Y^1-A^2-$ (9)

wherein each of $A^1$ and $A^2$ is a monocyclic divalent aryl group and $Y^1$ is a bridging group having one or two atoms that separate $A^1$ from $A^2$. In an exemplary embodiment, one atom separates $A^1$ from $A^2$. Illustrative non-limiting examples of bridging groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ may be a hydrocarbon group or a saturated hydrocarbon group such as methylene, cyclohexylidene, or isopropylidene. $Y^1$ may be a carbon-carbon bond (—) connecting $A^1$ and $A^2$. An example of an $R^1$ of formula (9) that has a carbon-carbon bond connecting $A^1$ and $A^2$ is the group derived from 4,4'-biphenol. In an embodiment, the $R^1$ groups are desirably minimally substituted with hydrocarbon-containing substituents such as, for example, alkyl, alkoxy, or alkylene substituents.

Carbonate units may be produced by the reaction of dihydroxy aromatic compounds having the formula HO—$R^1$—OH, which includes dihydroxy aromatic compounds of formula (10), also referred to herein as a bisphenol:

HO-$A^1$-$Y^1$-$A^2$-OH (10)

wherein $Y^1$, $A^1$ and $A^2$ are as described above. Also included are the more specific bisphenol compounds of general formula (11):

(11)

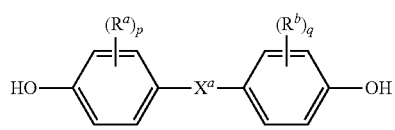

wherein $R^a$ and $R^b$ each represent a halogen atom or a monovalent hydrocarbon group and may be the same or different; p and q are each independently integers of 0 to 4. It will be understood herein that where no substituent group is specified for an atom, for example where p is 0 in formula (11), the unspecified valency or valencies will be occupied by a hydrogen atom or atoms sufficient to fill the unspecified valency or valencies, unless otherwise specified. Also, in formula (11), $X^a$ represents one of the groups of formula (12).

wherein $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group.

In an embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

In another embodiment, $X^a$ is an acyclic $C_{1-18}$ alkylidene group, a $C_{3-18}$ cycloalkylidene group, or a $C_{2-18}$ heterocycloalkylidene group, i.e., a cycloalkylidene group having up to three heteroatoms in the ring, wherein the heteroatoms include —O—, —S—, or —N(Z)—, where Z is hydrogen, halogen, hydroxy, $C_{1-12}$ alkyl, $C_{1-12}$ alkoxy, or $C_{1-12}$ acyl.

Specific examples of the types of bisphenol compounds represented by formula (12) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy aromatic compounds may also be used.

Another aromatic organic group $R^1$ (that is not a bisphenol) is derived from a dihydroxy aromatic compound of formula (13):

(13)

wherein each $R^f$ is independently a halogen atom, a $C_{1-10}$ hydrocarbon group, or a $C_{1-10}$ halogen substituted hydrocarbon group, and u is 0 to 4. The halogen is usually bromine. In an embodiment, compounds of formula (13) in which the —OH groups are substituted meta to one another, and wherein $R^f$ and u are as described above, are also generally referred to herein as resorcinols. Examples of compounds that may be represented by the formula (13) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds. In a specific embodiment, compounds of formula (13) are not substituted, with hydrocarbon-containing substituents. In an embodiment, where a dihydroxyaromatic compound of general formula (13) is used, less than or equal to 5 mol %, specifically less than or equal to 2 mol %, and still more specifically less than or equal to 1 mol % of the dihydroxyaromatic compound has alkyl, alkoxy, or alkylene substituents.

In an embodiment, useful carbonate units are derived from bisphenol compounds of formula (10). In a specific embodiment, carbonate units comprise bisphenol-A carbonate repeat units. In another specific embodiment, the copolymer comprises a combination of two or more carbonate units derived from dihydroxy aromatic compounds of formula (10), formula (11), formula (12), and formula (13). In an embodiment, the bisphenol carbonate units comprise 0 to 35 mol %, specifically 1 to 30 mol %, more specifically 2 to 25 mol %, and still more specifically, 3 to 20 mol %, of the total weight of the copolymer composition.

The aryl polyester carbonate also comprises ester units of formula (6)

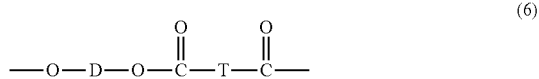

(6)

wherein D is a divalent group derived from a dihydroxy compound, and may be, for example, a $C_{6-20}$ alicyclic group or a $C_{6-20}$ aromatic group; and T is a divalent group derived from a dicarboxylic acid, and may be, for example, a $C_{6-20}$ alicyclic group, a $C_{6-20}$ alkylene-arylene group, or a $C_{6-20}$ arylene group. In a specific embodiment, T is a $C_{6-20}$ arylene group. In an embodiment, D is derived from a dihydroxy aromatic compound comprising formula (10), formula (11), formula (12), formula (13), or a combination comprising at least one of the foregoing dihydroxy aromatic compounds. The D and T groups are desirably minimally substituted with hydrocarbon-containing substituents such as alkyl, alkoxy, or alkylene substituents. In an embodiment, less than 5 mol %, specifically less than or equal to 2 mol %, and still more specifically less than or equal to 1 mol % of the combined number of moles of D and T groups are substituted with hydrocarbon-containing substituents such as alkyl, alkoxy, or alkylene substituents.

Examples of aromatic dicarboxylic acids from which the T group in the ester unit of formula (6) is derived include isophthalic or terephthalic acid, 1,2-di(p-carboxyphenyl) ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 99:1 to 1:99.

The ester units can be as illustrated in formula (14):

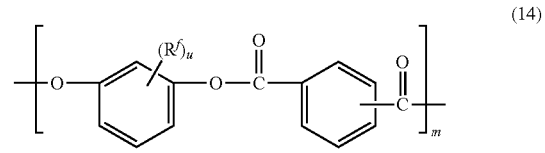

(14)

wherein $R^f$ and u are previously defined for formula (13), and m is greater than or equal to 4. Units of formula (14) are derived from a dihydroxy compound of formula (13) and an isophthalic acid derivative and/or a terephthalic acid derivative. Variable m can be 4 to 50, specifically 5 to 30, more specifically 5 to 25, and still more specifically 10 to 20. Variable m can also be less than or equal to 100, specifically less than or equal to 90, more specifically less than or equal to 70, and still more specifically less than or equal to 50. It will be understood that the low and high endpoint values for m are independently combinable. The molar ratio of isophthalate to terephthalate can be about 0.25:1 to about 4.0:1.

The optional siloxane units of formula (7) and formula (8) comprise repeating siloxane units (also referred to herein as "diorganosiloxane units") of formula (15):

(15)

wherein each occurrence of R is same or different, and is a $C_{1-13}$ monovalent organic group. For example, R may independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups may be fully or partially halogenated with fluorine, chlorine, bromine, or a combination thereof. Combinations of the foregoing R groups may be used in the same copolymer. In an embodiment, the polysiloxane comprises R groups that have a minimum hydrocarbon content. In a specific embodiment, an R group with a minimum hydrocarbon content is a methyl group.

The value of E in formula (15) may vary widely depending on the type and relative amount of each component in the thermoplastic composition, the desired properties of the composition, and like considerations. Herein, E has an average value of 5 to 50. E may have an average value of 16 to 50, specifically 20 to 45, and more specifically 25 to 45. E may have an average value of 4 to 15, specifically 5 to 15, more specifically 6 to 15, and still more specifically 7 to 10.

In formula (7) E is as defined above; each R may independently be the same or different, and is as defined above; and each Ar may independently be the same or different, and is a substituted or unsubstituted $C_{6-30}$ arylene group, wherein the bonds are directly connected to an aromatic moiety. Suitable Ar groups in formula (7) may be derived from a $C_{6-30}$ dihydroxy aromatic compound, for example a dihydroxy aromatic compound of formula (10), (11), (12), or (13) above. Combinations comprising at least one of the foregoing dihydroxy aromatic compounds may also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds may also be used. In an embodiment, the dihydroxy aromatic compound is unsubstituted, or is not substituted with non-aromatic hydrocarbon-containing substituents such as, for example, alkyl, alkoxy, or alkylene substituents.

Units of formula (8) may be derived from the corresponding dihydroxy aromatic compound of formula (16):

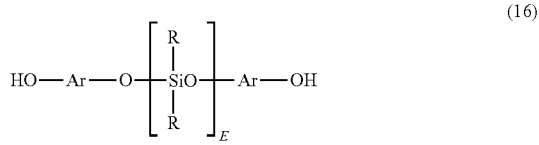

(16)

wherein R, Ar, and E are as described above. In a specific embodiment, where Ar is derived from resorcinol, the polysiloxane has formula (17):

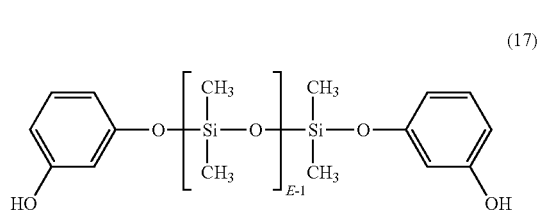

(17)

or, where Ar is derived from bisphenol-A, the polysiloxane has the formula (18)

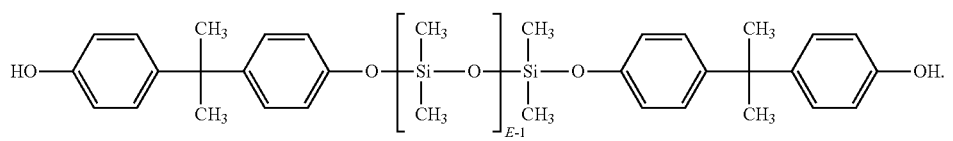

(18)

In formula (8) R and E are as described above, and each occurrence of $R^2$ is independently a divalent $C_{1-30}$ alkylene or $C_{7-30}$ arylene-alkylene. Units of formula (8) may be derived from the corresponding dihydroxy aromatic compound. In a specific embodiment, where $R^2$ is $C_{7-30}$ arylene-alkylene, the units are of formula (19):

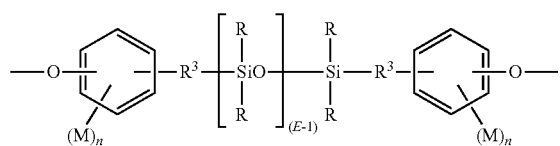

(19)

wherein R and E are as defined above. Each $R^3$ in formula (19) is independently a divalent $C_{2-8}$ aliphatic group. Each M in formula (19) may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

Units of formula (19) may be derived from the corresponding dihydroxy polydiorganosiloxanes (20):

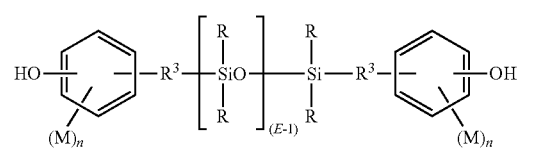

(20)

wherein R, E, M, $R^3$, and n are as described for formula (19).

In a specific embodiment, the dihydroxy polydiorganosiloxane has the structure given in formula (21):

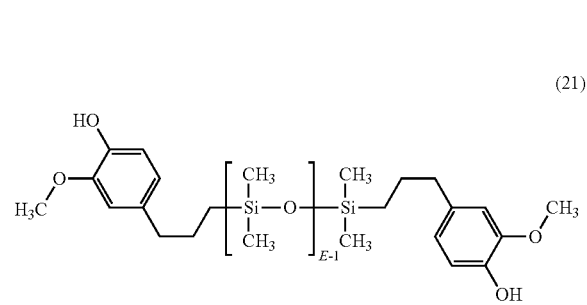

(21)

where E is as described above.

In another specific embodiment, the polydiorganosiloxane units are derived from dihydroxy oligodiorganosiloxanes of formula (22):

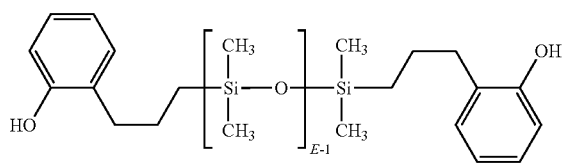

(22)

where E is as defined above.

In an embodiment, the copolymer comprises siloxane units in an amount of 0.5 to 20 mol %, specifically 1 to 10 mol % siloxane units, based on the combined mole percentages of siloxane units, ester units, and carbonate units, and provided that siloxane units are provided by polysiloxane units covalently bonded in the polymer backbone of the polysiloxane copolymer composition.

The copolymer can comprises siloxane units in an amount of 0.757 to 40 weight percent (wt %), based on the total weight of the copolymer. Within this range, the copolymer can comprise siloxane units in an amount of 0.2 to 10 wt %, specifically 0.2 to 6 wt %, more specifically 0.2 to 5 wt %, and still more specifically 0.25 to 2 wt %, based on the total weight of the copolymer, with the proviso that the siloxane units are provided by siloxane units covalently bonded in the polymer backbone of the copolymer. The siloxane units are sometimes referred to herein as silicone content.

In an embodiment, the copolymer comprises 0.2 to 6 wt % siloxane units, 50 to 99.8 wt % ester units, and 0 to 49.85 wt % carbonate units, wherein the combined weight percentages of the siloxane units, ester units, and carbonate units is 100 wt % of the total weight of the copolymer. In another embodiment, the siloxane copolymer composition comprises 0.25 to 2 wt % siloxane units, 60 to 94.75 wt % ester units, and 3.25 to 39.75 wt % carbonate units, wherein the combined weight percentages of the siloxane units, ester units, and carbonate units is 100 wt % of the total weight of the copolymer.

The aryl polyester carbonate copolymers described herein can be manufactured by different methods such as, for example, solution polymerization, interfacial polymerization, and melt polymerization. These methods are described in U.S. Pat. No. 7,790,292.

In some embodiments, greater than or equal to 50 mol % of copolymer units are ester units of formula (6), based on the total molar amount of all repeating units in the polymer. More specifically, greater than or equal to 70 mol %, or greater than or equal to 80 mol % of copolymer units are ester units of formula (6). In some embodiments D is derived from resorcinol. The amount of copolymer units are ester units of formula (6) wherein D is derived from resorcinol can be greater than or equal to 80 mol %. The amount of copolymer units are ester units of formula (6) wherein D is derived from resorcinol can be less or equal to 90 mol %.

The aryl polyester carbonate can have a weight average molecular weight of 5,000 to 80,000 grams per mole as determined by gel permeation chromatography according to ASTM D5296 using polycarbonate standards.

The composition comprises 1 to 20 weight percent of the aryl polyester carbonate, based on the combined weight of the polyphenylene ether sulfone and the aryl polyester carbonate copolymer. Within this range the composition may comprise 1 to 15 weight percent of the aryl polyester carbonate.

The composition may further comprise one or more additives such as antioxidants and phosphorous containing stabilizers. Antioxidants include phosphites, phosphonites and hindered phenols. Phosphorus containing stabilizers include triaryl phosphites, aryl phosphonates as well as difunctional phosphorus containing compounds. Phosphorus containing stabilizers are typically present in the composition at 0.001 to about 2% by weight of the entire formulation. Colorants, light stabilizers, optical brighteners, UV absorbers, flow aids and mold release compounds are also contemplated. Mold release agents are typically present in the composition at 0.05 to about 0.5% by weight of the formulation. Examples of mold release agents are alkyl carboxylic acid esters, for example, penta erythritol tetrastearate. Preferred mold release agents and stabilizers will have high molecular weight, typically greater than about 200, to prevent loss of the release agent from the molten polymer mixture during melt processing at above 300° C.

The thermoplastic composition can be prepared by melt mixing or a combination of dry blending and melt mixing. Melt mixing can be performed in single or twin screw type extruders or similar mixing devices that can apply a shear and heat to the components. Melt mixing can be performed at temperatures greater than or equal to the melting temperatures of the resorcinol based silicone aryl polyester carbonate and polyphenylene ether sulfone and less than the degradation temperatures of any of the components of the composition. In some embodiments suitable melt mixing is achieved at a temperature of 125 to 150° C. above the highest glass transition temperature of the two polymers.

All of the ingredients may be added initially to the processing system. In some embodiments, the ingredients may be added sequentially or through the use of one or more master batches.

The compositions described above can be used to make articles (including portions of articles). Exemplary articles include, aircraft interior panels, serving trays, luggage bins, window trim, serving carts, cookware, including microwave cookware, dairy equipment and the like. Articles can also comprise films, fibers, electrical conduits, connectors, sheets, tubes and hollow containers. Films can be single or multilayer films and can be used to coat or cover other substrates Films can be used as membranes or a component of a membrane. Articles can be made by any suitable method, e.g., injection molding, compression molding, sintering, thermoforming, blow molding, profile extrusion, melt spinning, gas assist molding, foam molding, rotomolding, solvent casting, and the like. Films may also be made from casting from a suitable solvent.

EXAMPLES

The compositions are further described by the following non-limiting examples. Numbers designate examples of the invention, comparative examples are shown by letters.

A sample of PPSU, Radel 5100 NT from Solvay Co. was melt processed on a twin screw extruder with various aryl polyester carbonates. The materials used in the experiments are shown in Table 1. Blends were shaken on a paint shaker for approximately 3 minutes prior to extrusion. Extrusion was done in a vacuum vented 2 lobe 30 millimeter (mm) WP extruder with a mixing screw, at a barrel set temperature between 270 and 320° C. and 300 rotations per minute (rpm) screw speed. Resin blends were not pre-dried. The extrudate was cooled through a water bath prior to pelletizing. Resin pellets were dried at 125° C. for at least 3 hours and injection molded.

Properties were measured using ASTM test methods. Melt flow rate (MFR) was run on dried pellets as per ASTM D1238 at 300° C. and 337° C. using a 6.7 kilogram weight after a 6 or 18 minute equilibration. All molded samples were conditioned for at least 48 hours at 50% relative humidity prior to testing. Multiaxial impact (MAI) was measured in 4×⅛ inch molded discs as per ASTM D3763 and total energy is reported in Joules (J). Glass transition temperature (Tg DSC) was determined according to ASTM D3418 using a 20 C/min heating rate. Results are reported in ° C. and were recorded on the second heat. Visual appearance; yellowness index (YI), percent transmission (% T) and percent haze (% H) were determined according to ASTM D1003 at 3.2 millimeter thickness. Notched Izod (NI) and Reverse Notched Izod (RN Izod) were determined according to ASTM D256 at 23° C. using a 10 pound hammer on 2.5×⅛ inch injection molded bars. Heat distortion temperature (HDT) was run on 3.2 mm bars as per ASTM method D648 using a 120° C./hr. heating rate. Dynamic mechanical analyses (DMA) was run on 3.2 mm injection molded bars at with a heating rate of 3° C./min at 1 Hertz in a flexural mode as per ASTM method D5418. Modulus was recorded as Mega Pascals (MPa), Tg was also recorded (Tg DMA) using this method. Tensile testing was done on 7.5 inch by ⅛ inch injection molded bars as per ASTM method D638 using a 50 mm/min crosshead speed. Tensile modulus was measured as tangent, tensile strength was measured at yield (Y) and percent elongation (%E) was measured at break (B).

TABLE 1

| Material Description | Source |
| --- | --- |
| RADEL R5100 Polyphenylene Ether Sulfone (PPSU) polymer from dichloro diphenyl sulfone and biphenol, Tg = 224° C. | Solvay Co. |
| ULTRASON E210 Polyethersulfone (PES) polymer from dichloro diphenyl sulfone and dihydroxy diphenyl sulfone, Tg = 227° C. | BASF Co. |
| UDEL P1700 Polysulfone (PSu) polymer from dichloro diphenyl sulfone and bisphenol A, Tg = 191° C. | Solvay Co. |
| (FST) about 80 mole % resorcinol iso and tere (1:1) phthalate ester linkages, 10 mole % resorcinol carbonate linkages, about 10 mole % bisphenol A (BPA) carbonate linkages and 1% of a D10 eugenol capped dimethyl siloxane. Tg = 130° C., Mw ~25,000 | SABIC Innovative Plastics |
| SLX9010 about 80 mole % resorcinol iso and tere (1:1) phthalate ester linkages, 10 mole % resorcinol carbonate linkages and about 10 mole % BPA carbonate linkages. Tg ~143° C., Mw~21,000 | SABIC Innovative Plastics |
| SLX2080 about 19 mole % resorcinol iso and tere (1:1) phthalate ester linkages, 6 mole % resorcinol carbonate linkages and about 75 mole % BPA carbonate linkages. Tg = 143° C., Mw ~30,000 | SABIC Innovative Plastics |
| LEXAN PPC4701 (PPC) is BPA copolyester carbonate containing about 80 mole % of a 93:7 mixture iso and tere phthalate ester groups and the remainder BPA carbonate groups, Mw ~28,000, Tg = 174° C. | SABIC Innovative Plastics |
| LEXAN PC 101 (PC) BPA Polycarbonate, Mw ~30,000, Tg ~150° C. | SABIC Innovative Plastics |

Table 2 shows a PPSU blend with 10 and 25% of FST a resorcinol derived aryl polyester carbonate polyester carbonate. At 10% the blend of example 1 is miscible with the PPSU with only 8.8% haze and a single Tg of 209° C. At 25% FST the PPSU blend of example B is opaque with 99% haze. The miscible blend of example 1 has increased melt flow of 2.1 cc/10 min at 300° C. compared to the PPSU melt flow of 1.3 cc/10 min. The clear PPSU-FST blend of example 1 has a multiaxial impact value of over 70 J/m.

TABLE 2

| | EXAMPLES | | |
| --- | --- | --- | --- |
| | A<br>100<br>PPSU | 1<br>90:10<br>PPSU:FST | B<br>75:25<br>PPSU:FST |
| part appearance | clear | clear | opaque |
| YI 3.2 mm | 50.2 | 68.0 | 130 |
| % T | 62.3 | 53.0 | 8.6 |
| % H | 3.6 | 8.8 | 99 |
| MVR 6 min 300° C. (6.7 kg) | 1.3 | 2.1 | 3.6 |
| MVR 18 min 300° C. | 1.3 | 2.2 | 3.9 |
| Tg1 DSC ° C. (20° C./min.) | 223.8 | 209.2 | 213.2 |
| Tg2 DSC ° C. | none | none | 138.4 |
| RN Izod J/m (% ductile) | 796 (100) | 731 (100) | 377 (20) |
| MAI Total E (J) | 86.2 | 82.1 | 73.5 |

Table 3 shows further characterization of improved melt flow of the 90:10 FST-PPSU blends in a measurement of viscosity vs. shear rate (l/sec.) at 330° C. showing lower viscosities (measured in Pa·s) at shear rates of 29 to 3007 l/sec. for the PPSU-FST blend of example 1, compared to the PPSU control A. Viscosity vs. shear rate was measured using capillary rheometry as per ASTM D3835.

TABLE 3

| | EXAMPLES | |
| --- | --- | --- |
| | A | 1 |
| | Shear Rate (1/sec.) | |
| | Shear Viscosity<br>(Pa-s) 330° C.<br>100 PPSU | Shear Viscosity<br>(Pa-s) 330° C.<br>90:10 PPSU:FST |
| 29 | 5471 | 4398 |
| 50 | 5732 | 4207 |
| 97 | 4493 | 3563 |
| 203 | 3479 | 2572 |
| 300 | 2858 | 2108 |
| 500 | 2074 | 1595 |
| 640 | 1781 | 1364 |
| 1002 | 1356 | 1024 |
| 1503 | 1011 | 788 |
| 3007 | 635 | 520 |

Table 3 shows the improvement in melt flow at 330° C. for the FST blends, compared to the PPSU control (example A). At every shear rate from 29 to 3007 l/sec., example 1 shows a lower melt viscosity, measured in Pascal seconds (Pa·s), than comparative example A. Lower viscosity will make it easier to fill large thin molded parts with complex geometries. Lower viscosity can also reduce the temperature at which a melt is processed often avoiding decomposition. Even with only 10% FST there is a significant improvement in melt flow (reduction in viscosity). The range of shear rates from 29 to 3007 l/sec. encompasses the various different shear rates encountered in many melt forming processes such as injection molding, blow molding and extrusion.

Table 4 shows Dynamic Mechanical Analysis (DMA) data for the 90:10 PPSU-FST blend (example 1) which has a consistently higher modulus (MPa) at 40 to190° C. than the PPSU control example A. DMA was run as per ASTM D4065 test in the flex mode a 1 Hz/min with a 3° C./min heating rate on a 3.2 mm injection molded bar.

TABLE 4

| | EXAMPLES | |
| --- | --- | --- |
| | A | 1 |
| | Modulus MPa | |
| ° C. | 100 PPSU | 90:10 PPSU:FST |
| 40 | 2008 | 2062 |
| 60 | 1885 | 1940 |
| 80 | 1743 | 1809 |
| 100 | 1644 | 1732 |
| 120 | 1582 | 1689 |
| 140 | 1541 | 1658 |
| 160 | 1523 | 1645 |
| 180 | 1545 | 1654 |
| 190 | 1570 | 1594 |

A second set of blends (Table 5) was done using 5 or 10 wt % of various aryl polyester carbonates with PPSU. All the aryl polyester carbonate blends; FST, SLX9010, PPC and SLX2080, examples 2-8, were clear with a %haze at 3 2 mm measured according to ASTM D1003 below 10%. Example D with 5% BPA PC was very hazy (% H 63.6). Data is shown in Table 5, which also shows the improved melt flow (higher MVR) over the PPSU control example C with MVR values over 8.5 cc/10 min at 337° C. Also note that there is less than 20% difference between the 6 and 18 min MVR indicating good melt stability of the PPSU polyester carbonate blends at the 337° C. melt processing temperature. Multi axial impact (MAI) is over 70 J and the HDT is above 175° C. for all the blends of examples 2 to 8. Data is shown in Table 5.

Another set of experiments (Table 7) compared the miscibility of SLX9010 with three different polysulfones. In example 9 the 85:15 blend of PPSU and SLX9010 is miscible giving % T of 57.9% and a % H below 6%. The PPSU-SLX blend has single Tg (206° C.) indicating a miscible system. Note that the blend of example 9 has higher notched Izod impact strength than controls E and F with a notched Izod impact of 137 J/m.

TABLE 5

| | EXAMPLES | | | | | | | | |
|---|---|---|---|---|---|---|---|---|---|
| | C | 2 | 3 | 4 | 5 | 6 | 7 | 8 | D |
| | 100 PPSU | 2% FST | 5% FST | 10% FST | 5% SLX9010 | 10% SLX9010 | 5% PPC | 5% SLX2080 | 5% PC |
| part appearance | clear yellow | clear yellow | clear yellow | clear yellow | clear yellow | clear yellow | clear yellow | clear yellow | v hazy |
| YI 3.2 mm | 62.1 | 69.9 | 69.9 | 69.8 | 71.4 | 57.7 | 60.3 | 56.1 | 107.4 |
| % T | 55.5 | 53.0 | 52.6 | 52.0 | 53.7 | 59.7 | 57.5 | 60.3 | 24.4 |
| % H | 8.1 | 6.3 | 6.6 | 8.4 | 5.6 | 5.3 | 7.1 | 5.9 | 63.6 |
| MVR 6 min 337° C. | 7.9 | 8.6 | 10.3 | 12.8 | 11.4 | 14.3 | 9.9 | 11.1 | 10.3 |
| MVR 18 min 337° C. | 8.0 | 8.5 | 10.7 | 13.4 | 11.9 | 15.0 | 9.6 | 11.8 | 10.5 |
| Visc. ~1000 sec-1 340° C. | 1123 | 1056 | 938 | 851 | 929 | 805 | 984 | 920 | 968 |
| Tg DSC ° C. | 224.2 | 222.4 | 216.8 | 210.3 | 215.8 | 208.4 | 220.0 | 215.8 | 220.1 |
| HDT 264 psi ° C. | 198 | 193 | 189 | 183 | 186 | 181 | 191 | 188 | 190 |
| MAI Total E (J) | 77.1 | 77.5 | 71.8 | 77.5 | 77.6 | 77.5 | 79.9 | 81.8 | 80.8 |
| T Mod MPa | 2270 | 2320 | 2380 | 2268 | 2340 | 2310 | 2290 | 2230 | 2260 |
| T Str. (Y) MPa | 71.4 | 73.8 | 75.2 | 75.0 | 76.8 | 77.2 | 72.3 | 74.2 | 72.9 |
| % Elong (B) | 89 | 63 | 106 | 106 | 87 | 68 | 78 | 79 | 104 |

Based on the appearance of the extruded strands the high (>50 mole %) resorcinol ester based resins; FST and SLX9010 (examples 2, 3, 4, 5 and 6) gave greater PPSU miscibility than the other ester carbonates (PPC & SLX2080 examples 7 and 8) which were all more compatible than the BPA-PC (example D).

Table 6 shows the viscosity vs. shear rate for the PPSU blends (examples 2-8) at 340° C. Note the improved flow (reduced viscosity) achieved with the PPSU polyester carbonate blends at all shear rates from 29 to 6989 l/sec. compared to the PPSU control example C. Viscosity vs. shear rate was run as per ASTM test D3835 using a capillary rheometer.

Surprisingly the 85:15 blends of polyether sulfone (PES), Example E, and polysulfone (PSu), Example F, even with the high resorcinol based aryl polyester carbonate (SLX9010) are immiscible having two phases giving a much lower % T and higher haze. It is only the biphenol containing PPSU and the aryl polyester carbonate, especially the resorcinol based aryl polyester carbonates, that give the miscible, high impact, high flow blends of the invention.

TABLE 6

| | EXAMPLES | | | | | | | |
|---|---|---|---|---|---|---|---|---|
| | C | 2 | 3 | 4 | 5 | 6 | 7 | 8 |
| Shear Rate | Shear Viscosity (Pa-s) 340° C. | | | | | | | |
| (1/sec.) | 100 PPSU | 2% FST | 5% FST | 10% FST | 5% SLX9010 | 10% SLX9010 | 5% PPC | 5% SLX2080 |
| 29 | 3969 | 3693 | 3022 | 2442 | 3016 | 2219 | 3205 | 2853 |
| 49 | 4161 | 3747 | 3188 | 2594 | 3024 | 2282 | 3245 | 2925 |
| 98 | 3548 | 3342 | 2804 | 2341 | 2704 | 2146 | 2923 | 2593 |
| 202 | 2716 | 2504 | 2151 | 1805 | 2071 | 1663 | 2212 | 2040 |
| 299 | 2283 | 2096 | 1818 | 1573 | 1758 | 1461 | 1891 | 1737 |
| 499 | 1745 | 1633 | 1434 | 1271 | 1406 | 1178 | 1496 | 1382 |
| 641 | 1491 | 1402 | 1238 | 1108 | 1219 | 1036 | 1303 | 1202 |
| 1002 | 1123 | 1056 | 938 | 851 | 929 | 805 | 984 | 920 |
| 1503 | 867 | 814 | 718 | 654 | 713 | 622 | 757 | 708 |
| 3006 | 586 | 549 | 484 | 417 | 468 | 396 | 512 | 466 |
| 5011 | 393 | 369 | 327 | 295 | 323 | 277 | 349 | 324 |
| 6989 | 673 | 295 | 257 | 232 | 253 | 221 | 274 | 256 |

TABLE 7

| | EXAMPLES | | |
|---|---|---|---|
| | 9 | E | F |
| part appearance | clear | opaque | very hazy |
| YI 3.2 mm | 63.4 | 94.9 | 37.0 |
| % T | 57.9 | 22.4 | 63.9 |
| % H | 5.1 | 99.1 | 33.1 |
| MVR 6 min 337° C. 6.7 Kg | 17.5 | 39.6 | 28.6 |
| MVR 18 min 337° C. | 18.8 | 93.8 | 26.6 |
| Tg DSC ° C. (20° C./min.) | 204.3 | 223.5 | 187.9 |
| Tg1 DMA ° C. (3° C./min.) | 205.8 | 221.6 | 186.7 |
| Tg2 DMA ° C. (3° C./min.) | none | 144 | 140 |
| N Izod J/m | 137.0 | 64.7 | 68.5 |
| HDT 264 psi ° C. | 177.4 | 191.2 | 165.7 |

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A composition consisting of 80 to 99 wt % of a polyphenylene ether sulfone and 1 to 20 wt % of an aryl polyester carbonate copolymer which optionally comprises siloxane units, based on the combined weight of the polyphenylene ether sulfone and the aryl polyester carbonate copolymer, and optionally one or more additives wherein the one or more additives comprise an antioxidant, phosphorus containing stabilizer, colorant, light stabilizer, optical brightener, UV absorber, or mold release agent and wherein the composition has a melt volume viscosity rate (MVR) at 337° C. with 6.7 Kg, as measured by ASTM D1238, of greater than or equal to 8.5 cc/10 minutes, and a single glass transition temperature (Tg), as measured by ASTM D3418, of greater than or equal to 200 ° C. and the composition is free of any additional copolymer comprising siloxane units.

2. The composition of claim 1, wherein the aryl polyester carbonate has a weight average molecular weight (Mw) of 5,000 to 80,000 Daltons.

3. The composition of claim 1, wherein the composition has a multiaxial impact strength, as measured by ASTM D3763, of greater than or equal to 70 Joules.

4. The composition of claim 1, wherein the polyphenylene ether sulfone and aryl polyester carbonate copolymer blend is transparent with a percent haze (%H) of less than or equal to 10% and a percent transmission (%T) of greater than or equal to 50 percent at 3.2 mm as measured according to ASTM D1003.

5. The composition of claim 1, wherein greater than or equal to 50 mol % of the aryl polyester carbonate copolymer units are ester units derived from resorcinol, based on the total molar amount of all repeating units in the polymer.

6. The composition of claim 1, wherein the composition comprises less than 0.1 wt % BPA polycarbonate based on the weight of the whole composition.

7. The composition of claim 1, wherein the phosphorous containing stabilizer has a molecular weight greater than 200.

8. The composition of claim 1, wherein the composition has a melt volume viscosity rate (MVR) at 337° C., using a six minute equilibration time, with 6.7 Kg, as measured by ASTM D1238, that is greater than or equal to 8.5 cc/10 minutes and wherein the melt viscosity rate, using an eighteen minute equilibration time at 300° C. with 6.7 Kg, is less than 30% higher than the 6 minute MVR value.

9. The composition of claim 8, having a heat distortion temperature at 264 psi of greater than or equal to 175° C.

10. The composition of claim 1, wherein the polyphenylene ether sulfone comprises repeating units having formula (1)

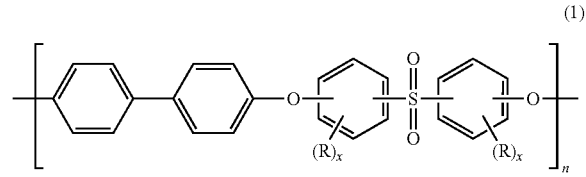

wherein R is hydrogen, alkyl, aryl, alkyl aryl, alkoxy, halogen or combination thereof, x equals 0 to 4, and n equals 25 to 1000.

11. The composition of claim 1, wherein the aryl polyester carbonate copolymer comprises greater than or equal to 50 mol % of ester units of formula (6) based on the total molar amount of all repeating units in the copolymer

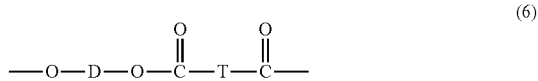

wherein D is a C6-20 alicyclic group or a C6-20 aromatic group; and T is a C6-20 alicyclic group, a C6-20 alkylene-arylene group, or a C6-20 arylene group.

12. The composition of claim 11, wherein D is derived from resorcinol.

13. The composition of claim 12, wherein the aryl polyester carbonate copolymer comprises greater than or equal to 80 mol % of ester units of formula (6).

* * * * *